United States Patent Office 3,306,672
Patented Feb. 28, 1967

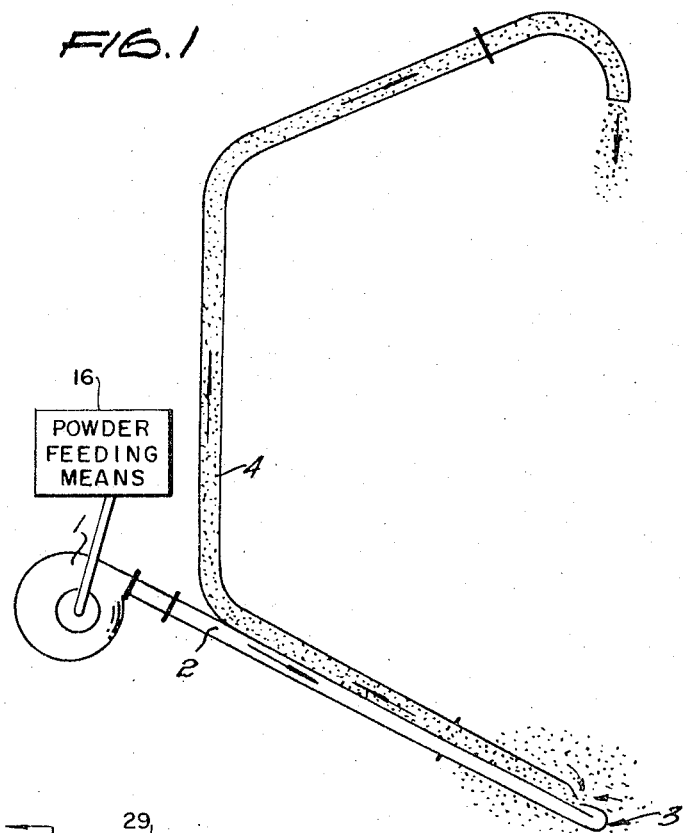
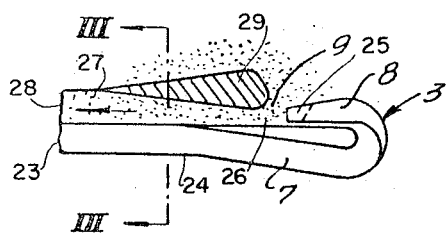
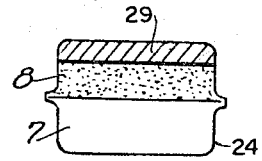
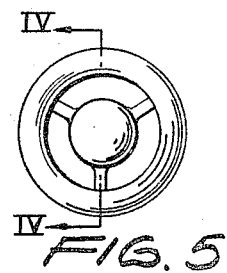
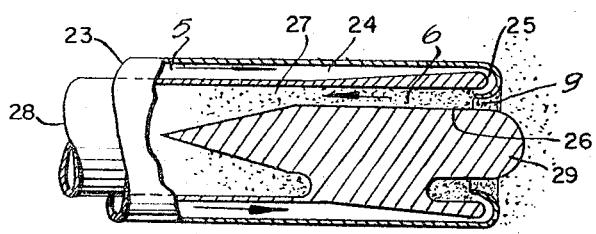
INVENTORS
Juan Edgardo Kleiner &
Szabolcs Bartha

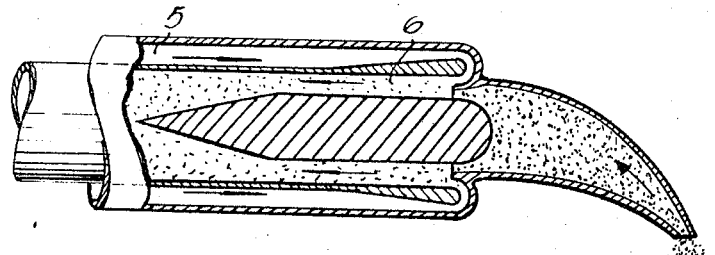
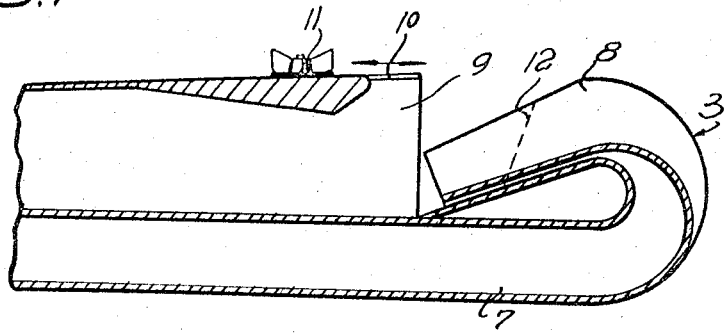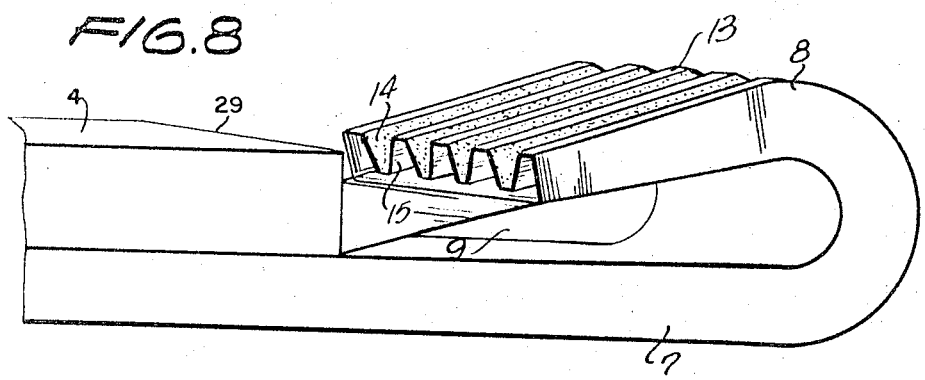

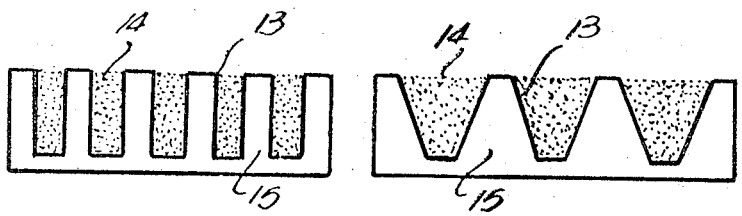
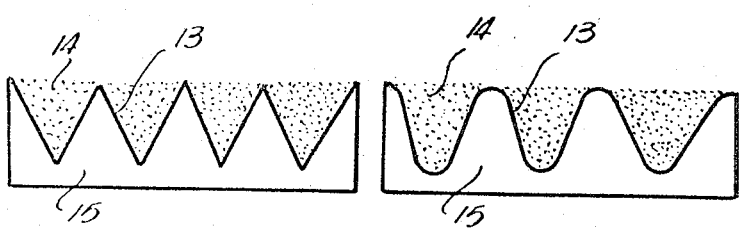

3,306,672
PNEUMATIC PROCESS FOR CONVEYING BULK MATERIAL AND A DEVICE FOR ITS APPLICATION
Juan E. Kleiner and Szabolcs Bartha, both of Sarmiento 459, 4° Piso, Ofi. 35, Buenos Aires, Argentina
Filed July 27, 1964, Ser. No. 385,240
12 Claims. (Cl. 302—17)

This invention refers to a pneumatic process for conveying bulk material and a device for its application.

According to a method already known, bulk material is drawn in through a tube or is conveyed by mechanical devices such as feed screws or chain conveyors towards the intake opening of the blower and through the latter, via pressure piping system, towards the unloading point. The material thus conveyed remains in the air current for the whole duration of the process, which, however, is not suitable for conveying delicate materials, for the blower is apt to harm them.

According to another conventional process, the material to be conveyed is drawn in by a ventilator or by a rotary piston blower through the intake head and suction piping into a centrifugal separator which separates the conveying air from the material thus conveyed, and from where the former is channelled via pressure piping system towards the unloading point. The material accumulating at the bottom of the centrifugal separator is introduced into the pressure piping system by means of a rotary metering and locking device, and then conveyed by the air current towards the unloading point. During this process, the material comes twice into contact with the conveying air current, and thus, twice, i.e. both on the suction and on the presure side of the blower, it has to increase its own speed to adapt it to the speed of the conveying air current.

According to another well-known procedure, the material to be conveyed is gravity-fed into the pressure piping system via a closing or locking unit or a mechanical device or a diffuser, and then conveyed under air pressure towards the unloading point. The loading of the material to be conveyed takes place directly after the blower or at another point of the pressure piping system the position of which with respect to the blower is fixed.

Installations for carrying out these well-known procedures are mostly stationary. Movable equipment used in agriculture for loading silos operate as fixed units which means that the intake head or the loading device is not adjustable with respect to the position of the blower.

It is the purpose of this invention to eliminate the drawbacks inherent to the procedures known so far.

According to this invention, the above purpose is achieved by powdered or granulated organic or inorganic bulk material being picked up either as a result of intake-head-generated-suction or by gravity, through an intake head movable in all directions, connected preferably with flexible pressure piping which is supplied by a blower with steam, air, gas or any mixture of said media, and being blown by any one of said conveying media towards a collecting point, through preferably a flexible piping system. The distance between the loading and the discharge point of the bulk material within the range determined by the pressure of the conveying medium is only limited by the length of the flexible connection between said two points. Therefore the bulk material comes into contact with the conveying air current only once, thus having to increase its speed only once to the conveyance speed.

Different from the well-known process, the new method may include a movable loading head, in which the pressure air is conducted in such a manner as to have its direction deviated by 180°, and in which, immediately behind the rechanneling point, a Venturi-type nozzle is provided, thus creating an intake head. Flexible hose may be used for the pressure piping leading to said intake head as well as for the feed piping leading away from it, thus ensuring a high degree of flexibility in all directions. The material to be conveyed comes into contact with the conveying air current only once and is continuously fed from the loading head towards the unloading point, without passing through the ventilator or the blower. The material to be conveyed is picked up by the intake head which acts as a suction pump and is loaded and immediately introduced into the feed piping system. The material to be conveyed has to be introduced into the feed piping system and accelerated only once. This results in power savings, and requires a simple apparatus as compared to the conventional pneumatic conveying process which requires equipment including centrifugal separators, gates or other mechanical units. Contrary to the suction process in the course of which the conveying air current is sucked in from the surrounding atmosphere in the very room in which the material is stored, thus requiring sufficient air supply at the intake point, this process does not depend on this factor at all, since the entire amount of air necessary for conveyance is supplied by the blower via pressure piping system. According to this procedure, to list just one example, underground silos can be emptied by moving the intake head up and down horizontally or vertically, and the grain can be blown onto a wagon along the free part of the feed piping system. In the same manner, trucks can be unloaded, or grain recirculated within a silo. It is also possible to air grain by conveying it from one silo to another.

According to this procedure, it is also possible to air grain stored in an underground silo by running the feeding device along the ground surface, while the intake head moves vertically to the travel direction of the feeding device.

Last but not least, emergency field depots made up by filled bags or walls of corrugated sheet metal can be filled in this manner by taking the grain say, off the truck, in the manner described above and by placing the discharge end of the piping system near the spaces to be filled.

An essential feature of the procedure as per invention consists of the possibility of adding vaporlike, powderlike or smokelike substances to the conveying medium by introducing them from the intake side of the blower. This enables bulk material to be in close contact with, say, pest control, coloring or aromatizing agents while being conveyed through the feed piping system.

Moreover, the invention covers a device for putting into execution the procedure as per invention, characterized by the fact that the intake head consists of two more or less parallel tubes connected with each other at the free end of the intake head for the purpose of rechanneling the conveying medium from one tube into the other, in one of which an admission opening for the bulk material has been provided behind the rechanneling point, in feed direction, preferably directly behind said rechanneling point.

The bulk material is picked up through the admission opening by suction; to achieve this, the intake head is put either on or into said material, while the bulk material conveyance medium, e.g. air, is supplied entirely by the pressure piping system.

For convenient execution of the invention, the two intake head tubes are in a coaxial positoin with respect to each other. At the free end of the intake head they are connected to enable air rechanneling.

This structure of the intake head may be complemented by a cylindrical or conical hood fixed onto the intake head and provided with a flat slot-like opening to enable the bulk material to be picked up by suction say, from below, with the intake head in an inclined position.

In another variation, both tubes run parallelly and are connected by an elbow at the end of the intake head.

It is specially convenient to have a flat intake head, provided with a loading tray, and to obtain the admission opening by placing the loading tray in an inclined position.

In order to increase the feed output, the line of contact between conveyance medium and bulk material, formed by the loading tray at the admission opening, is lengthened by corrugations or triangular folds provided in the loading tray.

Other details may be seen from the specifications set forth hereinafter. The drawings represent applications of the invention, as follows:

FIGURE 1 represents a schematic side view of the entire device for conveying bulk material;
FIGURE 2 a sectional side view of the intake head;
FIGURE 3 a section along line III—III on FIGURE 2;
FIGURE 4 a partially sectional view of another version of the intake head;
FIGURE 5 the front view of the intake head as per FIGURE 4;
FIGURE 6 the intake head as per FIGURE 4 with an additional device;
FIGURE 7 a longitudinal section through another version of the intake head;
FIGURE 8 another version of an intake head with a corrugated loading tray; and
FIGURES 9 through 12: several different loading tray versions.

The conveying device consists of a blower 1, a pressure piping system 2, an intake head 3 and a feed piping system 4. The intake head 3 comprises a pressure inlet section between orifices 23 and 24, a pressure outlet section between orifices 24 and 25, an intermediate section between orifices 25 and 26, a feed inlet section between orifices 26 and 27 with a flow guiding member 29, and a feed outlet section between orifices 27 and 28. The conveyance medium supplied by blower 1, e.g. steam, air, gas or any mixture of said media is channelled through the pressure piping system 2 towards the intake head 3, where it is rechannelled. For this purpose, the intake head preferably consists of two coaxial tubes, one of which 5 is coupled to the pressure piping system 2 and the other 6 to the feed piping system 4. At the end of the intake head, both tubes are connected with each other, in such a manner as to rechannel the air supplied by the blower via the outer tube 5 and to send it towards the feed piping system through the inner pipe 6, i.e. in the opposite direction.

In another version, the intake head consists of two parallel tubes 7 and 8 connected at the end of the intake head so as to enable the air supplied by the blower 1 to be rechannelled from pipe section 7 into pipe section 8 which is coupled onto the feed piping system.

In both versions of the intake head, an admission opening 9 for the bulk material is provided immediately behind the air rechanneling point. At said point, the pipe cross section tapers off thus creating a Venturi-type nozzle which produces suction and draws the bulk material into the feed piping system. The size of the admission opening may be adapted by a longitudinally travelling slide valve 10, held in place by a wing nut 11.

This adjustability is important because the device can thus be adapted to the specific weight and to the properties of the bulk material involved.

In direction towards the nozzle, i.e. from where the cross-section of pipeline 8 is beginning to taper off down to the bulk material admission opening 9, a sheet 12 may be placed on the upper side of the nozzle in pipe section 8, to convey the bulk material towards the feed opening.

In order to further increase the feed output, the upper part of pipe section 8 which represents the ceiling of the nozzle, is provided with corrugations, so as to form chutes 14 for the bulk material on the upper side and air current channels 15 on the lower side.

The corrugations may be, for instance, reactangular, trapezoidal, triangular or round-crested. By imparting this shape to the nozzle ceiling, the contact line between the bulk material and the conveyance medium is lengthened which considerably increases the suction output of the intake head.

We claim:

1. An apparatus for conveying granular and pulverized bulk material, loosely deposited on the ground and in bins, for easy manual handling for variegated jobs, comprising a blower; an elongated light-weight pressure-pipe having a circumference less than the grip of the human hand, flexibly connected to said blower; an elongated light-weight feed pipe having a diameter larger than that of said pressure pipe; the pressure pipe and the feed pipe assembled in counterflow parallel alignment; an intake head including at least the following five sections, a pressure inlet section connected to said pressure pipe, a pressure outlet section having a cross-sectional area diminishing away from the pressure inlet section, a feed inlet section, a feed outlet section connected to said feed pipe, and an intermediate section between the pressure outlet section and the feed inlet section, said pressure outlet section spaced from said feed inlet section and aligned therewith, a flow guiding member narrow at one end and wide at its other end attached with its narrow end to said feed outlet section and directed with its wide end toward said pressure outlet section to bound with said pressure inlet section laterally said feed inlet section, its wide end spaced from said pressure outlet section, thereby forming said intermediate section, said intermediate section thus providing a suction means for the material whereby the material may be reached closely adjacent to the ground and distant from the operator; the pressure outlet section having a longitudinal cross-sectional shape of at least one narrowing, hollow hook.

2. An apparatus as claimed in claim 1, said feed pipe and said pressure pipe having their external surfaces in contact; said pressure outlet section being a single said hook; said flow-guiding member attached to the feed outlet section to narrow with its wide end the feed inlet section and to form with its wide end also one side of the intermediate section.

3. An apparatus as claimed in claim 1, said feed pipe mounted co-axially within said pressure pipe along a central axis; said intake head with the pressure inlet section and the feed inlet section having ring-shaped cross-sections when viewed along their central axis, said flow-guiding member situated coaxially within the feed inlet section on the central axis; said pressure outlet section having a longitudinal cross-sectional shape with two narrowing, hollow hooks.

4. An apparatus as claimed in claim 2, and adjustable slide mounted on the outer surface of said flow-guiding member to adjust the intermediate section.

5. An apparatus as claimed in claim 2, said one hook having its outer surface longitudinally corrugated to form a plurality of parallel adjacent pressure outlet sections to provide a plurality of feeding chutes.

6. An apparatus as claimed in claim 1, and powder feeding means to feed powder into the blower.

7. An apparatus as claimed in claim 1, and a suction nozzle attached to the intermediate section.

8. An apparatus for conveying granular and pulverized bulk material, loosely deposited on the ground and in bins, for easy manual handling for variegated jobs, comprising: a blower; an elongated light-weight pressure-pipe having a circumference less than the grip of the human hand, flexibly connected to said blower; an elongated light-weight feed pipe having a diameter larger than that of said pressure pipe; the pressure pipe and the feed pipe assembled in counterflow parallel alignment; an intake head including at least the following five sections, a pressure inlet section connected to said pressure pipe, a pressure outlet section connected to the pressure inlet section and having a cross sectional area diminishing away from the point of connection, a feed inlet section, a feed outlet section connected on one end to said feed inlet section and on the other end to said feed pipe, and an intermediate section between the pressure outlet section and the feed inlet section; said pressure outlet section aligned with said feed inlet section; a flow guiding member narrow at one end and wide at its other end attached with its narrow end to said feed outlet section and directed with its wide end toward said pressure outlet section to bound with said pressure inlet section laterally said feed inlet section, its wide end spaced from said pressure outlet section, thereby forming said intermediate section, said intermediate section thus providing a suction means for the material whereby the material may be reached closely adjacent to the ground and distant from the operator; the pressure outlet section having the longitudinal cross sectional shape of a hollow hook.

9. An apparatus as claimed in claim 8, said feed pipe and said pressure pipe having their external surfaces in contact; said flow guiding member forming with its wide end an outwardly facing extension of the intermediate section.

10. An apparatus as in claim 8, further comprising an adjustable slide mounted on the outer surface of said flow guiding member to adjust the intermediate section.

11. An apparatus as in claim 8, said hook having its outer surface longitudinally corrugated to form a plurality of parallel adjacent pressure outlet sections to provide a plurality of feeding chutes.

12. An apparatus as in claim 8, further comprising a powder feeding means to feed powder into the blower intake.

References Cited by the Examiner
UNITED STATES PATENTS

| | | | |
|---|---|---|---|
| 424,638 | 4/1890 | Barclay et al. | 302—25 |
| 1,964,726 | 7/1934 | Engstrand | 302—25 |
| 2,019,968 | 11/1935 | Holloway | 302—25 |
| 2,461,104 | 2/1949 | Bates | 302—53 |
| 2,607,199 | 8/1952 | Christensen | 302—20 |
| 2,653,438 | 9/1953 | Ranirez | 302—25 |

ANDRES H. NIELSEN, *Primary Examiner.*